United States Patent [19]

Otto et al.

[11] Patent Number: 5,385,222

[45] Date of Patent: Jan. 31, 1995

[54] COUPLING FOR A HYDRODYNAMIC FLOW CONVERTER

[75] Inventors: Dieter Otto, Oberchern; Thomas Pfund, Lauf, both of Germany

[73] Assignee: Luk Getriebe-Systeme GmbH, Bühl/Baden, Germany

[21] Appl. No.: 109,079

[22] Filed: Aug. 19, 1993

[30] Foreign Application Priority Data

Aug. 21, 1992 [DE] Germany ............... 4227671

[51] Int. Cl.⁶ ............................................. F16H 45/02
[52] U.S. Cl. .................................. 192/3.29; 192/106.2
[58] Field of Search ............... 192/3.29, 3.28, 106.2, 192/70.18

[56] References Cited

U.S. PATENT DOCUMENTS

| | | | |
|---|---|---|---|
| 4,580,668 | 4/1986 | Pickard et al. | 192/3.29 |
| 4,969,544 | 11/1990 | Fujimoto | 192/3.29 |
| 5,065,853 | 11/1991 | Fujimoto et al. | 192/3.29 |
| 5,105,921 | 4/1992 | Fujimoto | 192/3.28 |
| 5,186,293 | 2/1993 | Fujimoto | 192/3.28 |

FOREIGN PATENT DOCUMENTS

| | | | |
|---|---|---|---|
| 58-156768 | 9/1983 | Japan | 192/3.29 |
| 59-62765 | 4/1984 | Japan | 192/3.29 |
| 2144495 | 3/1985 | United Kingdom | 192/3.29 |

*Primary Examiner*—Andrea L. Pitts
*Attorney, Agent, or Firm*—Darby & Darby

[57] ABSTRACT

A lock-up clutch for a flow converter having pump and turbine blades which are hydraulically coupled, in which a ring piston is located between the converter cover and the turbine blades. The ring-piston and converter cover have mating conically shaped friction surfaces, thereby leaving a wedge-shaped space between the converter cover the turbine blades and the friction surface of the ring piston. An annular damper unit located in the wedge-shaped space has a plurality of damper elements which are coupled to the turbine vanes by fingers extending from the turbine vanes.

9 Claims, 1 Drawing Sheet

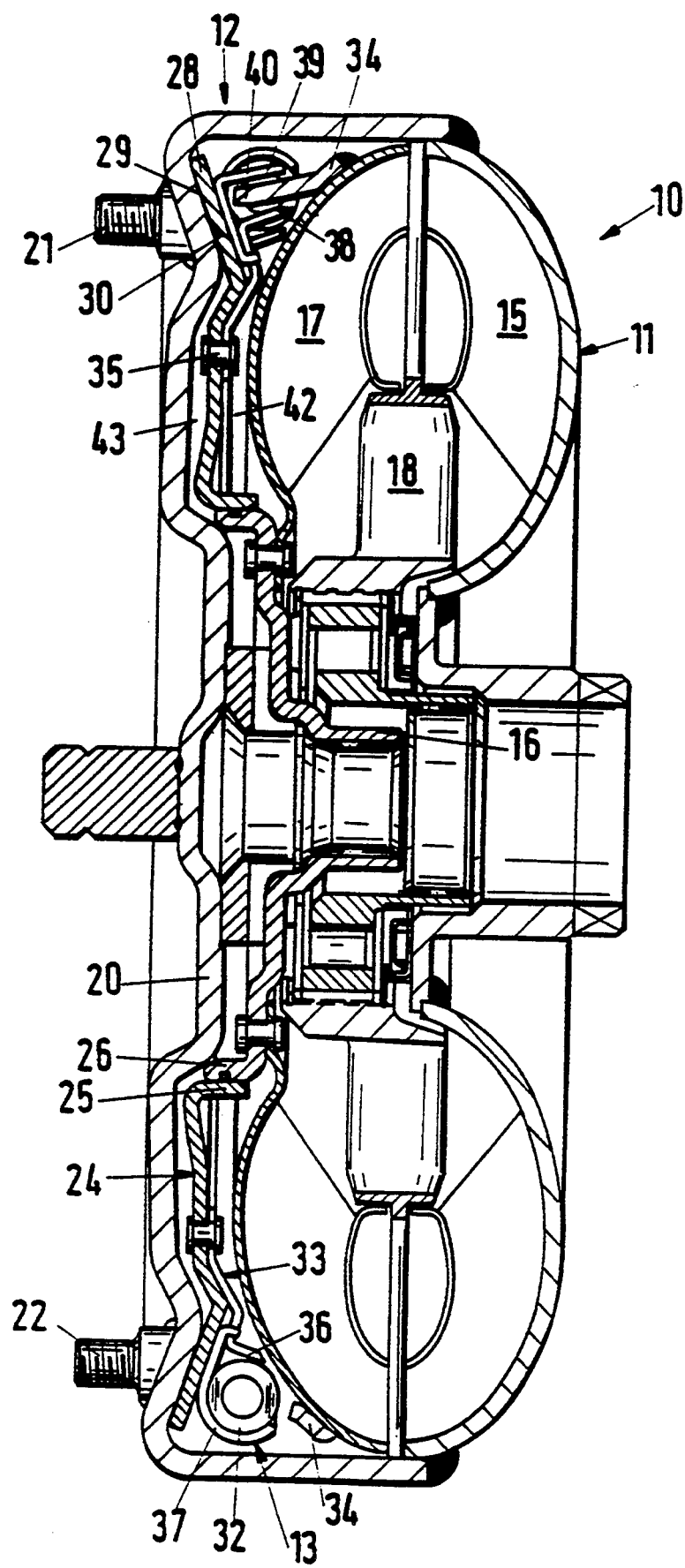

COUPLING FOR A HYDRODYNAMIC FLOW CONVERTER

BACKGROUND OF THE INVENTION

This invention refers to a lock-up clutch for a hydrodynamic flow converter with a pump-wheel, a turbine-wheel and guide-wheel. The pump-wheel and the turbine-wheel are centrally located within a fixedly mounted cover of the converter. Between the converter cover and turbine blades there is a ring piston having a conical clutch surface at its outer periphery for coacting with an inner surface of the cover. The turbine wheel has a sealing hub and a counter seal-hub which is used as the driving element for the ring piston. A damper unit having annular damper elements is mounted on the ring piston.

Lock-up clutches of this general type are already known. German Patent DE-05 32 36 621 describes a lock-up clutch with a pre-installed piston damper device for a hydrodynamic flow-unit. In this lock-up clutch there is a ring piston designed with a conical friction surface between the turbine blades and an enclosing converter cover. There is also a damper unit arranged between the traction surface and the converter pump-wheel, which pump wheel is fixedly mounted to the converter cover.

The damper unit of the aforementioned lock-up clutches comprises a damper with torsion spring means, which are constructed in annular fashion and disposed on the side of the ring piston that is directed toward the converter cover. The spring is located between the damper seal-hub and a corresponding conically shaped counter-friction surface co-acting with the converter cover traction surface.

The basic function of the lock-up clutch of the aforementioned kind and its aim is to provide an axially compact construction. It also provides the possibility of a resilient damper construction with large angular torsion possibilities.

BRIEF DESCRIPTION OF THE INVENTION

The invention provides a lock-up clutch in which a conically-shaped clutch friction disk of the ring piston interacts with a corresponding shaped counter friction surface of the converter cover which is spaced away from the turbine wheel and faces in a direction away from the side opening turbine vanes. There is a damper unit having circular damper elements located in the space between the radial outer area of the turbine wheel and the friction area surfaces of the ring piston and the converter cover.

In accordance with the invention, the interacting friction surfaces of the ring piston and the converter cover are conical surfaces laid out in opposite directions. This provides an enlarged space between the periphery of the turbine blades and the clutch friction disk of the ring piston which gives rise to an improved assembly potential for the damper unit, without influencing the typical power amplification required for the coacting conical clutches or requiring a specially reinforced design of the ring piston.

In the prior art, the damper unit is located between the ring piston and the converter cover and is disposed radially between the hub and the friction disk of the ring piston. This leads to an enlargement of the construction in the axial direction. The present invention, however, has the damper unit located in the space between the turbine blades and the friction disk of the ring piston, which is an already existing space. Due to this arrangement a considerable shortening of the assembly in the axial direction is achieved. A further important advantage achieved through this invention is that a larger angular torsion is realized because of this arrangement of the damper unit near the periphery of the ring piston.

In the preferred embodiment of the invention, the damper driven part is mounted non-rotatably to the outer region of the turbine blades, whereas the drive side is supported by the damper drive unit, which is mounted to the ring piston so it cannot rotate with it.

The damper driven part can be a ring part secured to the turbine by welding, and there are drive fingers of the ring part extending in the direction of the ring piston friction disk to engage the damper elements.

In a preferred embodiment, the damper drive unit is a leaf-spring like arrangement fixedly mounted to the ring piston so as to rotate with it. The damper drive unit is provided with take-up linkage pins or arms extending from the side of the friction clunch disk facing the converter turbine blades and engaging the damper spring elements, the pins at a front end having a head end used for support in the circumferential direction.

BRIEF DESCRIPTION OF THE DRAWINGS

Other objects and advantages of the present invention will become more apparent upon consideration of the following specification and the annexed drawing which is a view of the transducer in cross-section.

DETAILED DESCRIPTION OF THE INVENTION

The drawing shows a torque transfer system 10, which is illustratively to be used with a hydrodynamic torque converter. The unit includes a lock-up clutch 12 and a damper unit 13.

The unit has a torque converter 11 within which there is a rotating pump wheel 15 connected to be driven by an internalcombustion engine (not shown) and a turbine wheel 17 connected to a driven hub 16. The turbine wheel 17 has blades in flow communication relative to the blades of the pump. Located between the pump and turbine blades is a stationary guide wheel 18.

The converter has a cover 20 connected with the pump wheel 15 so as to rotate with it and has lugs 21, 22 for mounting the unit 10 to the engine. The lugs are on the same side as a flywheel (not shown) of the engine.

Between the turbine blades 17 and the converter cover 20 there is an annular ring-piston 24 which can be formed of pressformed sheetmetal. The ring-piston 24 extends radially from the central axis of the unit and has an inner upwardly turned hub 25 which is connected to a downwardly turned center hub 26 of the hub-section 16 of the turbine wheel. A peripheral clutch friction disk 28, which is a conical section, is angled downwardly from the center of the ring piston 24 and forms a conical friction surface 29.

A suitable lining is preferably placed on the friction surface 29 of the friction disk 28. The friction surface 29 interacts with a conforming conical counter friction surface 30 of the converter cover 20 which is non-rotatably mounted with respect to the cover 20.

The interacting conical friction surfaces 29 and 30 are directed outwardly from the turbine wheel 17. Due to this arrangement, an annular wedge-shaped space is formed between the peripheral area of the turbine wheel 17, the conical shaped friction disk 28 of the ring-piston 24, and the vertical part of the inner surface of the converter cover 20.

In this wedge-like space there is a damper-unit 13 having annular damper-spring-elements 32, which are supported on the ring-piston 24. The elements are non-rotatably supported by a damper-drive unit 33 on one end and engaged by a damper driven part 34, which are fixedly connected to the turbine blades 17, at the opposing end.

The damper-drive unit 33 is designed in leaf-spring form and is located on the side of the ring piston 24 facing the turbine wheel in the area between the ring-piston hub 25 and the friction disk 28 so as to overlie a part of friction disk 28. The damper-drive unit 33 is held by rivets 35 to the ring-piston 24. The outer portion of drive unit 33 has the contour of the surface of the friction surface 29 of the friction disk 28 and the ring-piston 24. The damper-drive unit 33 holds the periphery of the damper-spring elements 32 by finger like linkages 36, 37. The faces of the spring elements 32 are further supported by take-up pins 38, 39.

The damper driven unit 34 also has, in the peripheral range of the turbine blades 17, welded ring segments from which take-up pins 40 extend in the direction of the friction disk 28 of the ring-piston 24, which pins 40 engage the damper-spring elements 32. The spring elements 32 are consequently located between the take-up pins 38, 39 of the damper-drive unit 33 and the extending take-up pins 40 of the damper driven unit 34.

The lock-up clutch shown in the drawing has a front pressure chamber 42 located between the ring-piston 24 and the turbine blades 17, and a rear pressure chamber 43 located between the ring-piston 24 and the converter cover 20. The friction disk 28, working together with the counter-friction surface 30 of the converter cover 20 is activated by the pressure of the flow medium of the front pressure chamber 42 and by the setting of the transferred friction clutch moments, depending on the pressure difference between the front and rear pressure chambers 42, 43.

With the lock-up clutch 12 open, i.e., when the pressure in chambers 42, 43 is such that the friction surfaces 29, 30 are not engaged, the initial torque of the engine acts directly on the pump wheel 15 and is transferred via the turbine wheel 17 to the driven hub 16 due to the pressure of the hydraulic flow medium. If the lock-up clutch is completely closed, and therefore the friction disk 28 of the ring-piston 24 coacts in a slip-free manner with the counter-friction surface 30 of the converter cover 20, there is a direct mechanical transfer to the turbine blades 17 via the damper-spring element 32.

The initial torque acts on the turbine blades 17 and the connected driven hub 16, and from there via an automatic transmission unit, to driven wheels of the vehicle. If the lock-up clutch operates with slippage, depending on the pressure difference between the front and rear pressure chambers 42, 43 the initial torque introduces via the converter cover 20, depending on the amount of slippage, is distributed between the lock-up clutch 12 on the one hand and the converter 11 on the other.

The torque transfer from the lock-up clutch 12 to the turbine blades 17, which are connected to the driven hub 16, guarantees an effective balance of unevenness of the initiated torque. Control of larger spring movement is assured due to the arrangement of the damper-spring elements 32 in the area between the friction disk 28 of the ring-piston 24 and the turbine blades 17.

We claim:

1. A lock-up clutch in a hydrodynamic flow converter, the converter includes a converter cover, a pump wheel, a turbine wheel in fluid communication with the pump wheel and having a radial outer area, a ring piston located between the converter cover and the turbine wheel and being connected to the turbine wheel, and a ring shaped annular damper unit connected between said ring piston and said turbine wheel, said lock-up clutch comprising:

a first conical friction surface on an inner surface of said converter cover, said first conical friction surface opening away from said turbine wheel, a second conical friction surface on said piston ring to mate with said first friction surface, said second conical friction surface opening away from said turbine wheel, said first and second conical frictions surfaces forming a wedge shaped space with the radial outer area of the turbine wheel, and said ring shaped damper unit on said ring piston being located in the wedge shaped space between the radial outer area of the turbine wheel and the first and the second conical friction surfaces of the ring piston and the converter cover.

2. A lock-up clutch as in claim 1 wherein said damper unit comprises a plurality of damper elements.

3. A lock-up clutch as in claim 1, further comprising a damper driven unit connected to the radial outer area of the turbine wheel.

4. A lock-up clutch as in claim 3, wherein the damper driven unit further comprises a plurality of take up pins extending toward the friction surface of the ring piston.

5. A lock-up clutch as in claim 4 wherein said take up pins engage a damper drive unit.

6. A lock-up clutch as in claim 2, further comprising a damper driven unit connected to the radial outer area of the turbine wheel.

7. A lock-up clutch as in claim 6, wherein the damper driven unit further comprises a plurality of take up pins extending toward the friction surface of the ring piston to engage said damper elements.

8. A lock-up clutch as in claim 2 wherein said damper unit has protruding finger linkages engaging a periphery of said damper elements in a circumferential direction and supporting a plurality of take up pins engaging said damper elements.

9. A lock-up clutch as in claim 2 wherein a front pressure chamber is formed between one face of said ring piston and said turbine wheel, and a rear pressure chamber is formed between another face of said ring piston and said converter cover, the engagement of said ring piston and converter cover friction surface being controlled in accordance with a pressure difference between said two chambers.

* * * * *